UNITED STATES PATENT OFFICE.

CHARLES E. CALM, OF CHICAGO, ILLINOIS.

PRESERVING ANIMAL TISSUES.

No. 832,180.  Specification of Letters Patent.  Patented Oct. 2, 1906.

Application filed November 18, 1905. Serial No. 288,059.

*To all whom it may concern:*

Be it known that I, CHARLES E. CALM, a citizen of the United States, residing in the city of Chicago, in the county of Cook and State of Illinois, have discovered a new and useful Improvement in the Art of Preserving Animal Tissues, of which the following is a specification.

In studying the action of iron upon the live and dead cell structures of animal tissues I have discovered that the soluble ferric forms of iron salts have the properties of coagulating the protoplasma of the living cells, but have substantially no effect upon the dead-cell structures. Experiments with meat containing bacteria and other microorganisms showed that when a soluble ferric form of an iron salt was applied to meat, even in small quantities, it arrested, retarded, or inhibited for a time the bacterial growth and did not affect the cell structures of the meat or its nutritive qualities or physical appearance.

In a series of practical tests I found that when a soluble ferric salt was suitably applied to a piece of meat it would remain sweet and fresh at ordinary temperatures in the open air for a week or more and that the texture, fiber, taste, and nutritive properties were substantially the same as in the naturally fresh meat.

Certain ferric salts have long been used as drugs and are well known to physicians. It is known that when added to foods they neither retard nor affect digestion, but are excreted unaltered from the human system. It is therefore apparent that they may be used as a preservative for foods with entire safety. In other words, they may be mixed in food without danger of mischievous results. While all soluble ferric salts are adapted to preserve animal tissues when suitably applied thereto, there are certain well-known toxic ferric salts, the use of which must be avoided in the preservation of meat intended for human food since however useful they may be as preservatives, their presence would destroy food value. The term "toxic ferric salts" is to be taken as including all those ferric salts which are substantially poisonous to the human economy, but not those where no mischievous effect results when administered in food.

In practice I prefer to use from one to four ounces of soluble ferric salt to every hundred pounds of meat treated, which I have found to be approximately the maximum. If a double salt or an admixture of a ferric form of a soluble iron salt is used, it may be applied in the same proportions. These proportions may be varied according to the size of the pieces, the length of time they are to be preserved, or their condition. For example, if meat is freshly killed immediately after the animal heat is out the smaller proportion above mentioned may be used to advantage, while upon older, though strictly fresh, meat the larger proportion may be found desirable. In treating large pieces I prefer to wash or dip in solution; in treating sausage or chopped meat, to sprinkle with a dry or powdered form. In corning, curing, and pickling according to the well-known dry-cure process the meat may be sprinkled or thoroughly rubbed with the dry or powdered form. In corning, curing, and pickling according to the well-known brine process a solution of the ferric salt may be added to the brine. In preserving for a short time a relatively smaller portion of the soluble ferric salt is applied, while for a longer time larger proportions are used. To illustrate, in curing, corning, or pickling meat where preservation must be for a considerable time I have found it convenient to take the maximum proportions above mentioned. As the above proportions are based on unmixed ferric salt, due allowance should be made for double or admixed salts.

Whatever proportions are used or whatever methods of application, the soluble ferric salt in the meat will arrest or delay for a considerable space of time the bacterial growth and act as an antiseptic.

Among the soluble ferric salts which I have found particularly useful in the practice of my invention may be mentioned ferric nitrate, ferric sulfite, ferric borate and other ferric salts having non-toxical radicals. In the treatment of animal tissues not intended for use as foods I may add to the above list ferric cyanid, ferric arsenite, ferric permanganate, and other salts having toxical radicals.

I prefer to use ferric-nitrate, as it tends to maintain the natural red color of the meat, or as a double salt of the ferric form of iron potassium nitrate, or where sulfite is used in place of a nitrate a ferric sodium sulfite form of iron salt.

Having thus described my invention, what I claim as new, and desire to secure by Letters Patent, is—

1. The improvement in the art of preserving animal tissues, consisting in applying thereto in approximately the proportions specified those ferric salts which are substantially soluble in water at ordinary temperatures whereby the growth of bacteria and other micro-organisms is arrested.

2. The improvement in the art of preserving animal tissues, consisting in applying to the animal tissues in approximately the proportions specified a non-toxic ferric form of an iron salt, substantially soluble in water at ordinary temperatures whereby the growth of bacteria and other micro-organisms is arrested.

3. The improvement in the art of preserving meat, consisting in applying to the meat-tissues ferric nitrate, in approximately the proportions specified whereby the growth of bacteria and other micro-organisms is arrested.

4. The improvement in the art of preserving meat, consisting in applying thereto ferric potassium nitrate in approximately the proportions specified, whereby the growth of bacteria and other micro-organisms is arrested.

5. The improvement in the art of preserving meat, consisting in applying thereto ferric nitrate in the proportion of four ounces of ferric nitrate to one hundred pounds of meat, whereby the growth of bacteria and other micro-organisms is arrested.

In testimony whereof I hereunto affix my signature in the presence of two witnesses.

CHARLES E. CALM.

Witnesses:
CHARLES L. HINE,
ARTHUR GREENE.